United States Patent
Staudacher et al.

(10) Patent No.: US 9,282,238 B2
(45) Date of Patent: Mar. 8, 2016

(54) CAMERA SYSTEM FOR DETERMINING POSE QUALITY AND PROVIDING FEEDBACK TO A USER

(75) Inventors: David Staudacher, Fort Collins, CO (US); Daniel Bloom, Loveland, CO (US); Dan L. Dalton, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 989 days.

(21) Appl. No.: 12/915,725

(22) Filed: Oct. 29, 2010

(65) Prior Publication Data
US 2012/0105662 A1    May 3, 2012

(51) Int. Cl.
*H04N 5/228* (2006.01)
*H04N 5/232* (2006.01)

(52) U.S. Cl.
CPC ................. *H04N 5/23222* (2013.01)

(58) Field of Classification Search
CPC .................................... H04N 5/23222
USPC ...................................... 348/222.1
See application file for complete search history.

(56) References Cited

U.S. PATENT DOCUMENTS

| | | | |
|---|---|---|---|
| 6,606,458 B2 * | 8/2003 | Umeda et al. ................. 396/110 |
| 7,664,389 B2 | 2/2010 | Kretz et al. | |
| 7,742,079 B2 | 6/2010 | Rainier et al. | |
| 2002/0049728 A1 * | 4/2002 | Kaku ................. 707/1 |
| 2004/0239776 A1 * | 12/2004 | Shinohara et al. ............. 348/239 |
| 2004/0239777 A1 * | 12/2004 | Nakamura et al. ............ 348/239 |
| 2005/0024516 A1 | 2/2005 | Fish et al. | |
| 2007/0019083 A1 * | 1/2007 | Nakashima ................... 348/239 |
| 2008/0169930 A1 | 7/2008 | Mallinson | |
| 2008/0240518 A1 | 10/2008 | Haynes et al. | |
| 2009/0059021 A1 | 3/2009 | Rimon et al. | |
| 2010/0149343 A1 | 6/2010 | Kim et al. | |
| 2010/0177207 A1 * | 7/2010 | Fukuda ...................... 348/222.1 |

FOREIGN PATENT DOCUMENTS

| EP | 2139226 A | 12/2009 |
|---|---|---|
| WO | WO 2008/031369 A1 | 3/2008 |
| WO | WO 2009/095168 A | 8/2009 |

OTHER PUBLICATIONS

Publication, http://www.inventionreaction.com/new-invention/Smile-Recognition-Camera-Captures-Perfect-Photo, Publication Date Nov. 6, 2007, pp. 1-4.

* cited by examiner

*Primary Examiner* — Usman Khan
(74) *Attorney, Agent, or Firm* — Tarolli, Sundheim, Covell & Tummino L.L.P.

(57) ABSTRACT

A camera system may include an image sensor to generate real-time image data of a scene having a subject. A pose evaluator can generate a pose metric signal having a pose value that provides a variable measure of a pose quality for the subject in the scene. A pose feedback indicator can provide user-perceptible feedback demonstrating the value of the pose metric signal, such that the variable measure of the pose quality is provided.

15 Claims, 2 Drawing Sheets

CAMERA SYSTEM FOR DETERMINING POSE QUALITY AND PROVIDING FEEDBACK TO A USER

BACKGROUND

Image capturing devices, such as cameras, are often used to capture images of persons, or groups of persons, animals, and wildlife. The acceptability of a resulting image depends largely on each subject behaving in a particular way (e.g., smiling, looking at the camera and not moving) at the time when the image is captured. An additional complexity can occur when the photograph is being taken through the use of a timer, such that the photographer is unable to instruct the subjects to behave when the image is being captured.

DETAILED DESCRIPTION

Figure 1:
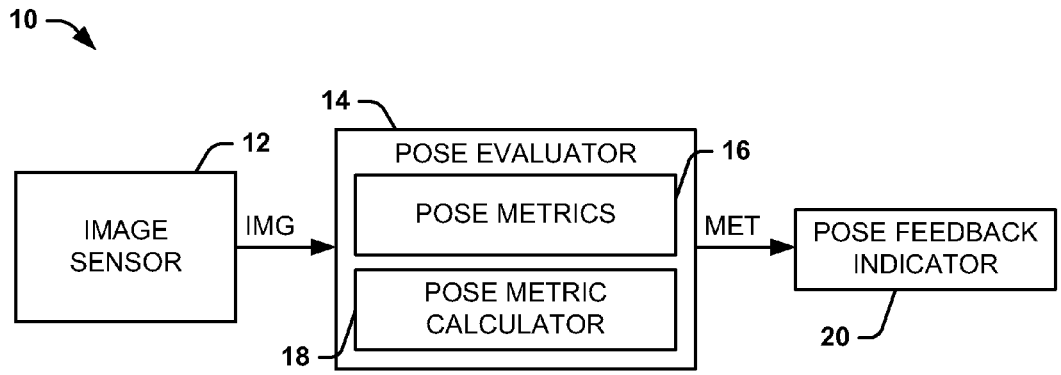
FIG. 1 illustrates an example of a camera system.

FIG. 1 illustrates an example of a camera system 10. The camera system 10 can be implemented as part of a camera device, or as part of a wireless communication device or other device that includes a camera. The camera system 10 includes an image sensor 12. The image sensor 12 can be implemented as a digital imaging device, such as a charged coupled device (CCD) or CMOS sensor. A CCD is typically comprised of an array of pixels that convert light into an electrical charge. The charge from each pixel is clocked out of the CCD and converted into the digital domain using an analog-to-digital (A/D) converter. As the size of the CCD increases, the number of pixels also increases. For instance, an optical image can be provided to the image sensor 12 by an arrangement of camera components that are implemented to capture images, such as including a lens and focusing assembly. The image sensor 12 can also employ controls that are implemented by a user to capture the still photograph, such as including a shutter button. Furthermore, the image sensor 12 can include additional image capture controls, such as can be activated to delay automatic capture of the still photograph (e.g., based on a timer and/or other trigger, as described in greater detail herein).

The image sensor 12 can generate digital image data IMG in real time. The image data IMG can correspond to the image that the image sensor receives through the associated lens in real time. As an example, the image data IMG can be provided to a digital screen (not shown) on a user interface of the camera system 10. The image data IMG can thus correspond to a real-time image that can be captured, such as in response to the user pressing a shutter button. The representation of the image data IMG can be evaluated by the user to determine if the image is acceptable before capturing the image.

Photographers often capture photographs of human subjects. It is often desirable for the subjects to exhibit certain appearance characteristics when being photographed. Examples of desirable characteristics include each person looking at the camera, smiling, not moving, keeping their eyes open, and the like. Failure to exhibit desirable appearance characteristics in a sufficient manner can typically include capturing repeat photographs, which can waste memory space or drain batteries in a digital camera and can be frustrating to the photographer and/or the subjects.

The camera system 10 includes a pose evaluator 14 that is configured to analyze the real-time image via the image data IMG to provide measure of pose quality for the subjects in a given scene. The pose evaluator can provide the measure of pose quality as a value that varies based an analysis of one or more appearance characteristics.

The pose evaluator 14 can be operative to evaluate the image data IMG and to provide a measure of pose quality for the scene. The pose evaluator 14 can be implemented as machine readable instructions that can be executed by a processor or as logic. The pose evaluator 14 can employ one or more pose metrics 16, that can provide a measure of a respective pose characteristic associated with one or more subjects in a given image scene. Each of the pose metrics 16 can be programmed to quantify different pose-related characteristics for subjects in a given scene. As an example, the pose metrics can include a set of human expression detection routines, such as smile detection, detecting occlusion of faces, detecting whether the subjects are facing the camera, detecting whether each subjects eyes are open or any of a variety of other expression algorithms. The pose metrics 16 can also include restrictive expression detection routines, such as to detect undesirable expressions (e.g., "bunny ears" behind the head of a subject). The pose metrics 16 can also include a motion detection routine to provide a measure of motion of one or more subjects in the image scene, such as based on analysis of image data IMG from multiple image frames. Each the pose metrics 14 thus can provide a measure of a respective pose-related characteristic based on the image data IMG. The pose metrics can be pre-programmed for use by the pose evaluator or they can be selectively activated and deactivated (e.g., automatically or in response to user input) according to the scene being photographed.

The pose evaluator 14 includes a pose metric calculator 18 that is configured to generate a pose metric signal MET having a value varies based on the results of the pose metrics 16. For example, the pose metric signal MET can have a value that is calculated as a function of the values of each or a subset of the pose metrics 16 based on the image data IMG. While the pose metric signal MET can be a single signal having an analog or digital value, the value can be derived from a plurality of separately evaluated pose metrics. For example, the value of the pose metric signal MET can be based on concurrent information regarding how many of the subjects are smiling (e.g., provided by a smile detection routine), how many of the subjects are facing the camera and to what extent, and how many of the subjects' faces are fully visible (e.g., by a facial occlusion routine), how many of the subjects' eyes are open (e.g., by a eyes open detection routine), and how many of the subjects are stationary (e.g., by a motion detection routine). The pose metric calculator 18 can combine the results from such separately analyzed metrics to derive the value of the pose metric signal MET. The pose metric calculator 18 can combine such results, for example, in either equal contributions or individually weighted contributions.

In the example of FIG. 1, the camera system 10 also includes a pose feedback indicator 20. The pose feedback indicator 20 can be configured to generate a user-perceptible feedback indication based on the value of the pose metric signal MET. As an example, the pose feedback indicator 20 can output a visual indication of pose quality. The visual indication can be provided on a display, such as a percentage number or a scale, a written quality indication (e.g., "bad", "good", "excellent", etc.). Alternatively or additionally, a visual indication can be implemented by one or more light-emitting diodes (LEDs) that provide a pseudo-analog scale, color, or blinking frequency based on quality. The visual indication can be provided in a manner to be perceived by the subjects, by the photographer or both.

As another example, the pose feedback indicator 20 can provide the feedback as an audible indication of pose quality. For instance, the audible feedback can provide a "beep" sound having a pitch or beeping frequency that represents the value of the pose metric signal MET. Alternatively, the audible feedback can be provided as vocal instructions.

As yet another example, the pose feedback indicator 20 can incorporate both visual and audible feedback mechanisms. Furthermore, the pose feedback indicator 20 can be configured to generate multiple feedback mechanisms concurrently for a given scene. For instance, one feedback mechanism can be utilized to provide an indication of pose quality based on one or more of the pose metrics 16 and another separate feedback mechanism can be generated based on one or more other pose metrics. As an example, one feedback mechanism can be employed in response to identifying a restrictive expression to indicate the subjects that one or more of them are providing an undesirable pose (e.g., bunny ears above a subject's head). In addition to providing such user-perceptible feedback, the feedback can be utilized to prevent the image capture process.

The pose feedback indicator 20 can be located at a backside of the camera system 10, such that a photographer that is capturing the photograph can be provided with the user-perceptible feedback indication regarding the quality of the appearance of the subjects, as provided by the image data IMG. Thus, the photographer can capture the photograph upon the pose feedback indicator 20 indicating that the image data IMG will result in a satisfactory photograph based on the pose metrics 16. As another example, the photographer can provide an input to the camera system 10, such that the camera system 10 can be configured to capture the photograph automatically upon the pose metric signal MET exceeding a predetermined pose quality threshold.

Additionally or alternatively, the pose feedback indicator 20 can be located at a front-side of the camera system 10, such that the subjects of the image data IMG can perceive the user-perceptible feedback. For instance, a photographer can set a remote photograph feature (e.g., a timer) and move to within the frame of view of the image sensor 12, such that the camera system 10 can capture the photograph automatically based when the timer times out. Alternatively, the camera can be configured to capture the image when the timer times out provided that the pose metric signal MET also exceeds a predetermined pose quality threshold. As described herein, the user-perceptible feedback can vary commensurate with the value of the pose metric signal MET, such as to guide the subjects toward an improved pose quality.

Figure 2:
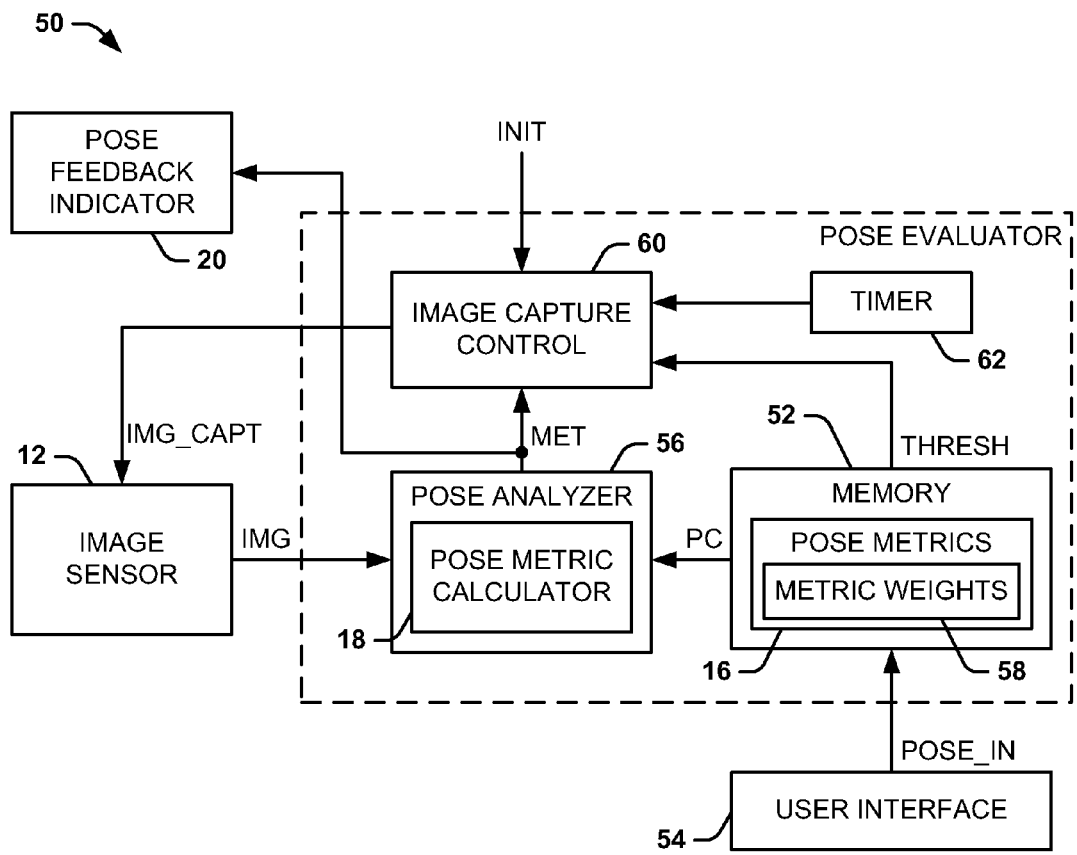
FIG. 2 illustrates another example of a camera system.

FIG. 2 illustrates another example of a camera system 50. Similar to as described above in the example of FIG. 1, the camera system 50 can be implemented as part of a camera device, or as part of a portable electronic device that includes a camera function (e.g., cell phone, video game, MP3 player, or the like). The camera system 50 can correspond to the camera system 10 in the example of FIG. 1. Therefore, reference may be made to the example of FIG. 1 in the following description of the example of FIG. 2.

The camera system 50 includes the image sensor 12. The image sensor 12 can include the CCD that receives optical information from a lens and which is implemented to capture still photographs. The image sensor 12 can also be configured to generate image data IMG in real time. The image data IMG can correspond to the image that is observed through the associated lens and focusing assembly and provided as an optical image to the image sensor 12. As an example, a representation of the image data IMG can be provided to a digital screen (not shown), such as on a user interface 54 of the camera system 50. The image data IMG can thus correspond to the real-time image that can be captured as a still photograph, such as via the signal INIT provided to the image sensor 12. Accordingly, the image data IMG can be evaluated manually by the user to determine if the real-time image is acceptable before capturing the still photograph.

In the example of FIG. 2, the camera system 50 includes the pose evaluator 14 and a memory 52 that stores the pose metrics 16. The pose evaluator 14 also includes a pose analyzer 56 that analyzes the image data IMG according to the pose metrics 16 associated with the one or more human subjects, provided to the pose analyzer 56 from the memory 52 via a signal PC. The image data IMG can be stored in the memory 52 of the camera system and processed by the pose analyzer 56. As an example, the pose metrics 16 can include machine readable instructions for implementing detection routines (e.g., human expression, motion detection, occlusion detection, smile detection, undesirable expression detection) on the image data IMG, such as explained with respect to FIG. 1. The pose evaluator 14 can thus analyze the image data IMG according to the pose metrics 16 to provide a measure of pose quality.

The pose analyzer 56 includes the pose metric calculator 18 that generates the pose metric signal MET. The pose metric calculator 18 generates the pose metric signal MET to have a value that is computed based on the pose metrics 16 and associated metric weights 58. That is, the pose metric calculator 18 computes the pose metric signal based on the image data IMG and applies metric weights 58 to derive the metric value representing overall pose quality. For instance, the metric weights can be set to indicate a relative importance that a given metric has in the overall quality of a scene.

As an example, the metric weights 58 can be programmable weights that determine separate and individual contributions of the different pose metrics 16 that are evaluated by the pose analyzer 56 to derive the value of the pose metric signal MET. For instance, weights can be established to place more emphasis on motion of subjects than on the subjects facing the camera, and to place more emphasis on facing the camera than on smiling, but may still require the subjects to face towards the camera. Thus, the metric weights 58 can be programmed such that the contribution of motion is twice that of smiling at the camera with regard to the value of the pose metric signal MET. Accordingly, the separately analyzed metrics can be derived from the image data IMG, each of which can independently contribute to the value of the pose metric signal MET according to the respective metric weights 58.

As a further example, a user can employ the user interface 54 to configure one or more of the pose metrics 16 and metric weights 58, demonstrated in FIG. 2 as a signal POSE_IN. The user interface 54 can be employed to access controls and functions that are part of the associated the camera system 50. For instance, the user interface 54 can be utilized to select a type of a setting or scene (e.g., single person, group or team, or the like), which can in turn automatically enable a predetermined set of metrics and weights for the metrics 58 based on the selection. Alternatively, a user can manually select which of the pose metrics 16 to utilize and associated metric weights 58 such as based on their own experience and preferences. As another alternative, the pose analyzer can ascertain information from the image data IMG and select an appropriate set of metrics and configure respective metric weights based on such analysis. The pose metrics 16 and metric weights 58 may further be extensible, such as can be modified and augmented. For instance, the user interface 54 can be a computer that communicatively couples with the camera system 50, such that the pose characteristics 16 are configured via a computer program or software module (e.g., via a plug-in module to the camera system 50).

When a scene contains multiple subjects, the pose analyzer can generate the value of the pose metric signal MET according to a percentage of the multiple subjects that satisfy each of the pose metrics 16. Alternatively or additionally, the pose analyzer can generate the value of the pose metric signal MET based on the relative size of detected faces, such as by affording a greater weight to larger faces (e.g., via a facial detection algorithm). As an example, it may be difficult to get a dozen or more subjects to all be smiling in a given photograph. Thus, the pose metric signal generator 58 can generate the value of the pose metric signal MET to correspond to the number of subjects that are smiling, facing the camera, and/or satisfying other pose characteristics 16, including separate contributions as to how well each of the subjects satisfy the pose characteristics 16. As a result, the value of the pose metric signal MET can vary based on the number of subjects that satisfy the one or more pose characteristics 16.

In addition, the pose analyzer 56 can be configured to analyze the image data IMG for undesirable and/or restrictive poses of the subjects based on the configured pose metrics 16. For example, the metric calculator 18 can be configured to set the pose metric signal MET to have a low or zero value in response to the pose analyzer 56 detecting a restrictive pose (e.g., an obscene or other unwelcome gesture) of one or more of the subjects. If a restrictive pose metric 16 detects such a restricted pose characteristic, the feedback indicator can generate a feedback specifically designed to alert one or more user. For instance, if the restrictive pose is "bunny ears" behind a subjects head, the feedback can be a distinct sound or verbal alert of its occurrence. Additionally or alternatively, detection of one or more restrictive pose characteristic can be used to prevent the image sensor 12 from capturing the image, regardless of how many other subjects are providing acceptable poses and expressions. Accordingly, the camera system 50 can be configured to ensure that an acceptable photograph of the real-time image represented by the image data IMG is captured based on the pose metric signal MET.

The pose analyzer 56 provides the pose metric signal MET to a pose feedback indicator 20 to provide a user-perceptible feedback demonstrating the value of the pose metric signal MET. The user-perceptible feedback indication can include one or both of visual and audible indicators. In addition, the pose feedback indicator 20 can be located at a back-side of the camera system 50, such that a photographer that is capturing the photograph can be provided with the user-perceptible feedback demonstrating the pose quality of the scene of the subjects, as provided by the image data IMG. Additionally or alternatively, the pose feedback indicator 20 can be located to provide feedback that is perceptible by one or more user located at a front-side of the camera system 50.

A user input signal INIT can be provided to an image capture control 60 to signal initiating image capture via a signal IMG_CAPT that is provided to the image sensor 12, such as in response to the photographer depressing the shutter button or a remote photography feature to capture the image. As an example, the photographer can configure the camera system 50 to capture the photograph automatically upon the pose metric signal MET exceeding a threshold signal THRESH, such as having a value stored in the memory 52, and expiration of a timer 62. Prior to image capture, such as from a time when the input INIT is provided, the feedback indicator 20 can provide the user-perceptible feedback (e.g., audible, visual or both) which varies according to the pose metric signal MET to urge the subjects toward a desired high level of pose quality. Thus, as described above, the user can set a remote photograph feature via the input INIT and move to within the frame of view of the image sensor 12. Thus, the camera system 50 can capture the photograph automatically upon the pose metric signal MET exceeding the predetermined threshold. In such situations, the pose feedback indicator 20 can provide the user-perceptible feedback indication in real-time, or can demonstrate that the pose metric signal MET exceeds the threshold signal THRESH to indicate an imminent capture of the photograph.

By way of further example, the image capture control 60 can be configured to control image capture based at least in part on the pose metric signal MET. For instance, the image capture control 60 can compare the value of the pose metric signal with a threshold signal THRESH, such as stored in the memory 52. As an example, the threshold signal THRESH can be configurable by the user via the user interface 54. The threshold signal THRESH can include one or more predetermined values that can be directly compared with the value of the pose metric signal MET. Thus, the image capture control 60 can generate the trigger signal IMG_CAPT in response to the value of the pose metric signal MET meeting the value of the threshold signal THRESH. As another example, the threshold signal THRESH can be associated with a time-based predetermined configurable condition associated with the pose metric signal MET. Therefore, as an example, the image capture control 60 can trigger image capture via the IMG_CAPT in response to the value of the pose metric signal MET exceeding the value of the threshold signal THRESH for a configurable amount of time, as determined by the timer 62.

The camera system 50 can thus be configured to automatically capture a photograph based on the comparison of the pose metric signal MET with the threshold signal THRESH. For example, the user could provide the signal INIT as a command to initiate automatic photograph capture. Thus, upon the metric comparator 60 determining that the pose metric signal MET exceeds the threshold signal THRESH, the metric comparator 60 can provide the signal IMG_CAPT to the image sensor 12 to automatically capture the photograph. This can allow the camera system 50 to remotely capture the photograph of one or more subjects, without the photographer viewing the real-time image represented by the image data IMG and without the use of a timer that can capture the photograph at the wrong time.

Figure 3:
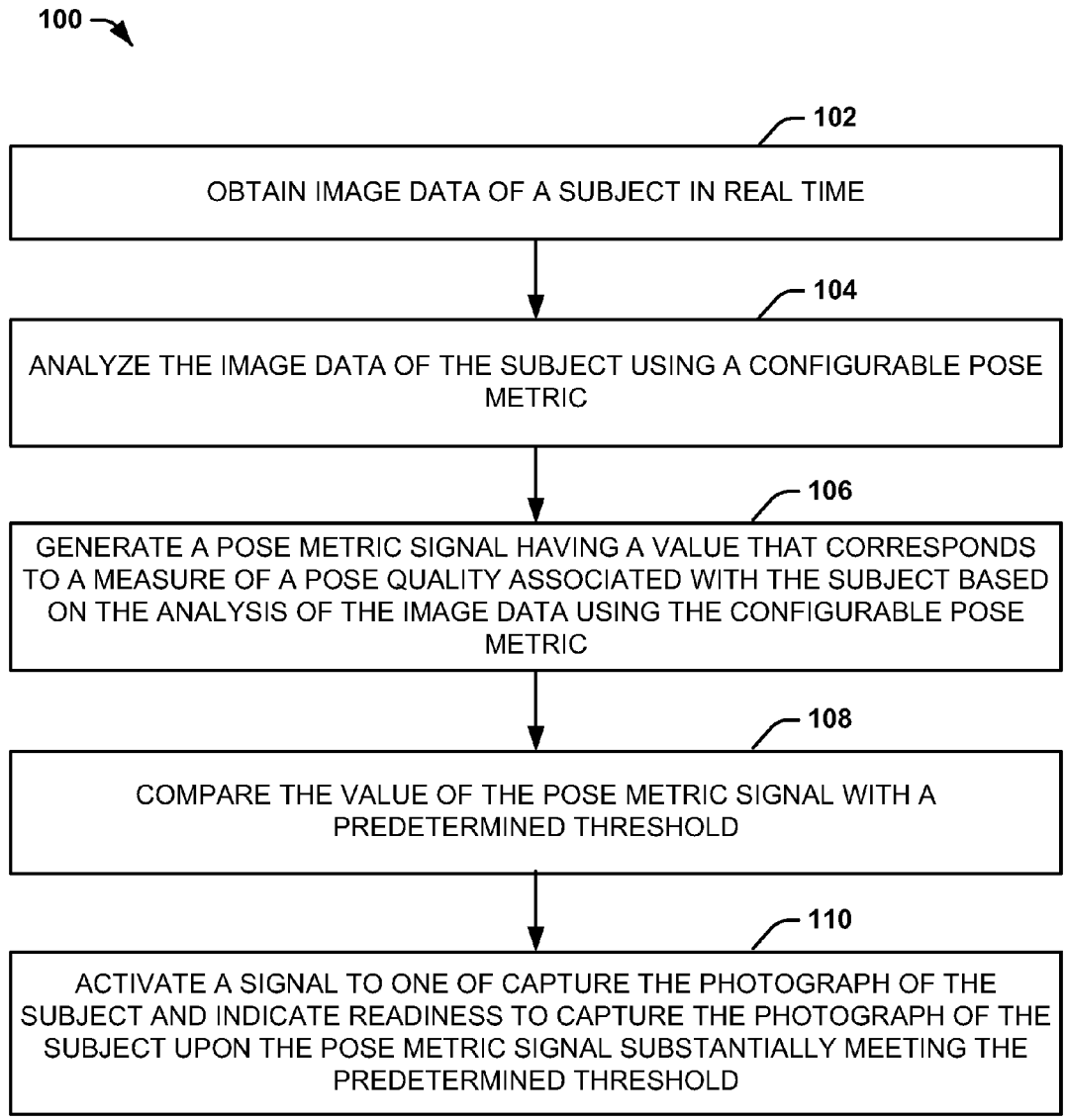
FIG. 3 illustrates an example of a method for capturing a photograph of a subject.

In view of the foregoing structural and functional features described above, an example method will be better appreciated with reference to FIG. 3. While, for purposes of simplicity of explanation, the method of FIG. 3 is shown and described as executing serially, it is to be understood and appreciated that the method is not limited by the illustrated order, as parts of the method could occur in different orders and/or concurrently from that shown and described herein.

FIG. 3 illustrates an example of a method 100 for capturing a photograph of a subject. At 102, image data of the subject is obtained in real time (e.g., via image sensor 12). At 104, the image data of the subject is analyzed using a configurable pose metric (e.g., via pose analyzer 56). At 106, a pose metric signal is generated having a value that corresponds to a measure of a pose quality associated with the subject based on the analysis of the image data using the plurality of configurable pose characteristics (e.g., via the pose analyzer 56). At 108, the value of the pose metric signal is compared with a predetermined threshold (e.g., via the metric comparator 60). At 110, a signal is activated to one of capture the photograph of the subject and indicate readiness to capture the photograph of the subject upon the pose metric signal substantially meeting the predetermined threshold (e.g., via the metric comparator 60).

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. A camera system comprising:
    an image sensor to generate image data of a scene having one or more subjects; and
    a processor coupled to the image sensor to implement:
        a pose evaluator to (i) analyze the image data to determine a pose value for each of a plurality of pose metrics that corresponds to different pose-related characteristics for the one or more subjects in the scene, and (ii) combine the determined pose values for each of the plurality of pose metrics to generate a pose metric signal having a combined pose value, the combined pose value providing a variable measure of a pose quality for the one or more subjects in the scene; and
        a pose feedback indicator to provide a user-perceptible feedback demonstrating the combined pose value of the pose metric signal, the user-perceptible feedback representing the variable measure of the pose quality for the one or more subjects in the scene.

2. The system of claim 1, wherein the processor further implements a metric calculator to determine the combined pose value of the pose metric signal based, at least in part, on a predetermined pose metric that is configurable by a user via a user interface provided by the camera system.

3. The system of claim 1, wherein the user-perceptible feedback comprises an audible indication, a visual indication or both an audible and visual indication.

4. The system of claim 1, wherein the processor further implements an image capture control, wherein the pose metric signal is provided to the image capture control that compares the pose metric signal with a predetermined threshold, and wherein in response to the combined pose value of the pose metric signal substantially meeting a value of the predetermined threshold, the image capture control activates a signal to (i) capture a photograph of the scene, or (ii) indicate readiness to capture the photograph of the scene.

5. The system of claim 4, wherein the predetermined threshold is configurable by a user.

6. The system of claim 4, further comprising a timer, wherein the predetermined threshold is a time-based parameter that is enabled in response to activation of the timer.

7. The system of claim 1, further comprising a memory resource storing metric weights for each of the plurality of pose metrics, and wherein the pose evaluator applies a respective metric weight to the pose value of each of the plurality of pose metrics in order to generate the combined value of the pose metric signal.

8. The system of claim 7, wherein the metric weights are individually configurable by a user.

9. The system of claim 7, wherein the pose feedback indicator provides the user-perceptible feedback by providing a first type of user-perceptible feedback based on a value of at least one of the plurality of pose metrics and a second type of user-perceptible feedback based on a value of another of the plurality of pose metrics.

10. The system of claim 1, wherein the plurality of pose metrics comprises a prohibitive pose characteristic to prevent the camera system from capturing an image of the scene upon detecting that the image data includes the prohibitive pose characteristic.

11. A camera system comprising:
    an image sensor to generate image data of a scene in real time, the scene having one or more subjects;
    a memory resource; and
    a processor coupled to the image sensor and the memory resource, the processor to:
        receive image data from the image sensor;
        analyze the image data to determine a pose value for each of a plurality of pose metrics that corresponds to different pose-related characteristics for the one or more subjects in the scene;
        apply metric weights to determine weighted pose values for each of the plurality of pose metrics, the metric weights defining a relative importance of the different pose-related characteristics;
        combine the weighted pose values for each of the plurality of pose metrics to generate a pose metric signal having a combined pose value, the combined pose value providing a variable measure of a pose quality for the one or more subjects in the scene.

12. The system of claim 11, wherein the processor further provides a user-perceptible feedback indicating the combined pose value of the pose metric signal.

13. A method for capturing an image of a scene having one or more subjects, the method being performed by a processor and comprising:
    receiving image data of the scene in real time from an image sensor;
    analyzing the image data of the scene to determine a pose value for each of a plurality of pose metrics that corresponds to different pose-related characteristics for the one or more subjects in the scene;
    combine the pose values for each of the plurality of pose metrics to generate a pose metric signal having a combined pose value, the combined pose value providing a variable measure of a pose quality for the one or more subjects in the scene; and
    generating a user-perceptible feedback indication that demonstrates the combined pose value of the pose metric signal to a user.

14. The method of claim 13, further comprising weighting each of the plurality of pose metrics based on respective assigned metric weights to control what each of the plurality of pose metrics contributes to the variable measure of the pose quality.

15. The method of claim 13, wherein generating the user-perceptible feedback indication includes generating at least one of an audible indication or a visual indication.

\* \* \* \* \*